Feb. 17, 1970     L. M. RICE     3,496,377

ELECTRO-THERMAL SEQUENCING APPARATUS

Filed Aug. 19, 1968

Lindsey M. Rice,
Inventor.
Koenig, Senniger,
Powers and Leavitt,
Attorneys.

United States Patent Office 3,496,377
Patented Feb. 17, 1970

3,496,377
ELECTRO-THERMAL SEQUENCING APPARATUS
Lindsey M. Rice, Attleboro, Mass., assignor to Texas Instruments Incorporated, Dallas, Tex., a corporation of Delaware
Filed Aug. 19, 1968, Ser. No. 753,528
Int. Cl. H02j 3/14
U.S. Cl. 307—41                                    7 Claims

ABSTRACT OF THE DISCLOSURE

The sequencer described herein employs a plurality of pairs of thermistors which pass through electro-thermal cycles in sequence once one such cycle is initiated. The sequencer is provided with a memory which also comprises a plurality of thermistors which are thermally coupled to respective ones of said pairs. The memory operates to reinitiate an interrupted sequence of electro-thermal cycles substantially at the point of interruption within the sequence.

---

This invention relates to electro-thermal sequencers and more particularly to such sequencers which, when interrupted in operation, will resume an interrupted sequence of operation substantially from the point of interruption.

Copending, coassigned application Ser. No. 608,230, filed Jan. 9, 1967 discloses an electro-thermal sequencer or timer which is suitable for controlling a sequential series of operations at timed intervals. The sequence shown, while it employs novel electro-thermal components and the novel use of thermal coupling between elements, is generally of the ring counter type in which the operation of each of a plurality of stages triggers operation of a subsequent stage. After an interruption of the sequence of operations of this type of sequencer it may not start or resume operation from whatever point or condition it was in when interrupted. In certain applications employing such sequencers it is desirable that upon restarting or resumption of operation the apparatus will always restart at the same point or condition it was in when interrupted.

Among the several objects of the present invention may be noted the provision of electro-thermal sequencing apparatus which will resume an interrupted sequence of operations substantially from the point of interruption within the sequence; the provision of such apparatus is suited for timing relatively long periods; the provision of such apparatus which is highly reliable and long lived; and the provision of such apparatus which is relatively simple and inexpensive. Other objects and features will be in part apparent and in part pointed out hereinafter.

Briefly, electro-thermal sequencing apparatus of this invention involves a first plurality of thermistors which are of the same temperature coefficient type and which are interconnected with an electric power source for providing stable, continuing self-heating energization of any one of the plurality in which self-heating is initiated, the initiation of self-heating in the one thermistor being operative to terminate continued self-heating energization of any other previously energized thermistor in the plurality. The apparatus also includes a plurality of pairs of thermistors, there being one pair for each of the individual thermistors in said first plurality. One of the thermistors in each pair is of a first temperature coefficient type and the other being of the opposite temperature coefficient type. Circuit means are provided for interconnecting the thermistors in each pair with each other to provide electrical coupling therebetween and to connect each pair with an electric power source so that heating of the thermistor of the first coefficient type in one of the pairs will initiate an electro-thermal cycle in which the one and then the other of the thermistors in the one pair pass through self-heating phases. The thermistor of the aforesaid opposite coefficient type in each of a group of the pairs is thermally coupled to the thermistor of the aforesaid first coefficient type in another of the pairs and thus the occurrence of an electro-thermal cycle in the one of the pairs will initiate an electro-thermal cycle in another pair thereby providing a sequence of electro-thermal cycles in successive pairs. Means are provided for thermally coupling each of the thermistors in the first plurality of thermistors to one of the thermistors in a respective one of the pairs of thermistors thereby to initiate stable self-heating energization of each thermistor in the first plurality when the respective pair passes through an electro-thermal cycle. Accordingly, if electric power is cut off from the pairs during a sequence of electro-thermal cycles while the energization of said first plurality is maintained, the then energized thermistor in the aforesaid first plurality will continue to be energized and will thereafter initiate an electro-thermal cycle in the respective pair of thermistors when electric power is reapplied thereto thereby to restart the sequence substantially from the point of interruption.

The invention accordingly comprises the constructions hereinafter described, the scope of the invention being indicated in the following claims.

In the accompanying drawings in which one of various possible embodiments of the invention is illustrated, FIG. 1 is a schematic circuit diagram of electro-thermal sequencing apparatus of this invention; employing a plurality of pairs of thermistors, each pair of which includes a PTC and an NTC thermistor;

Corresponding reference characters indicate corresponding parts throughout the several views of the drawings.

Figure 1:
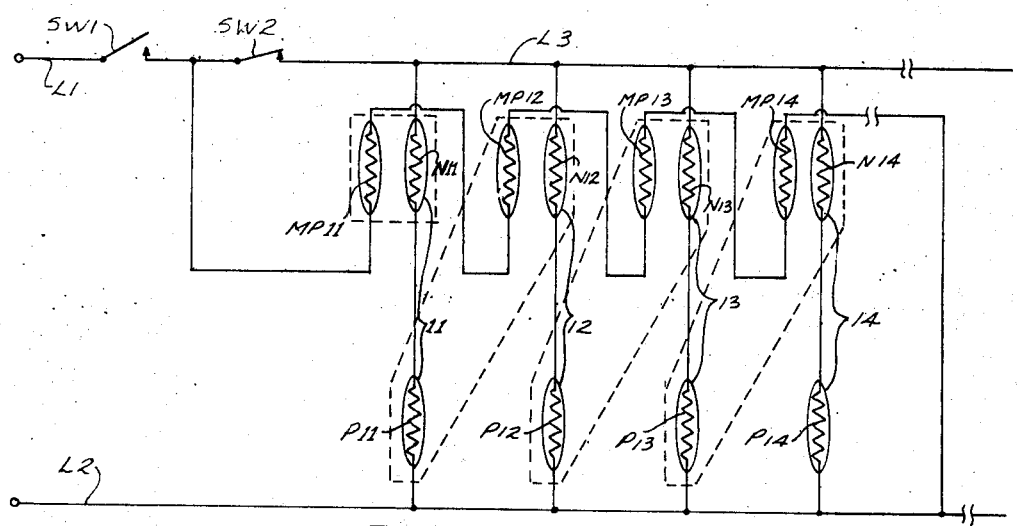

Referring now to FIG. 1, electrical power at substantially constant voltage is supplied to the apparatus through a pair of supply leads L1 and L2, the lead L2 constituting common or ground potential. Since the thermal behavior of the various thermistors employed in the apparatus is governed essentially by the power dissipated therein, direct current of either polarity may be applied to the leads L1 and L2 or alternating current of equivalent r.m.s. voltage may be used. A lead L3 is provided with power through a pair of switches SW1 and SW2.

The sequencing apparatus includes a plurality of pairs (11–14) of thermistors. Each pair comprises a substantially bistable switching stage and includes one thermistor having a positive temperature coefficient (PTC) of resistivity, P11–P14 respectively, and a second thermistor having a negative temperature coefficient (NTC) of resistivity, N11–N14 respectively. The PTC thermistor and the NTC thermistor constituting each pair are connected in series with each other across leads L3 and L2 thereby providing electrical coupling therebetween.

The PTC thermistor (P11–P13) in each of a group (11–13) of the pairs is thermally coupled to the NTC thermistor (N12–N14) in another pair (12–14 respectively), means providing such coupling being indicated by the dotted lines enclosing the respectively coupled thermistors. This thermal coupling may, for example, be provided by electrically insulated metallic strips or by mounting the thermistors in close heat-exchange relationship in which case the supporting members constitute the means providing coupling. With such thermal coupling, if PTC thermistor P11 self-heats, heat will be applied to NTC thermistor N12 by conduction through the thermal coupling.

Figure 2:
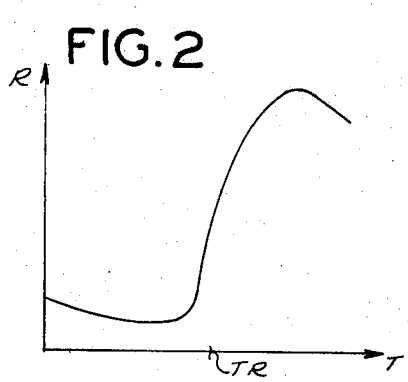
FIG. 2 is a graph representing the changes in resistance with respect to changes in temperature of PTC thermistors employed in the apparatus of FIG. 1.

Preferably, the PTC thermistors P11–P14 are of the type having a sharply defined transition temperature above which the thermistor material's resistance increases sharply. An example of a material which possesses such a resistance characteristic is doped barium titanate ($BaTiO_3$). The behavior of the resistance of this material is represented in FIG. 2 with respect to changes in temperature, the transition temperature being indicated on the temperature scale at TR.

Figure 4:
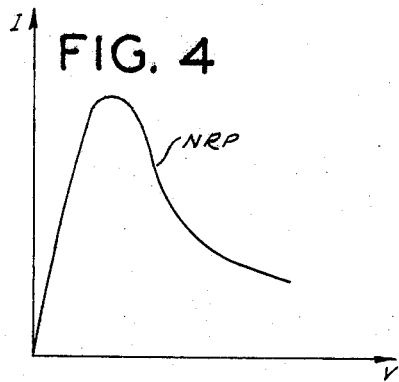
FIG. 4 is a graph representing the current/voltage behavior of the PTC thermistors.
Figure 5:
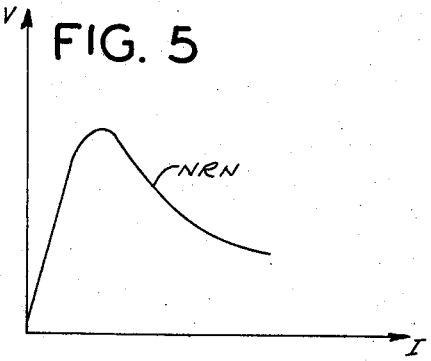
FIG. 5 is a graph representing the voltage/current behavior of the NTC thermistors.

Thermistors constructed of this material have an equilibrium current/voltage characteristic, as illustrated in FIG. 4, which has a pronounced negative resistance region as indicated at NRP, that is, the equilibrium current passing through the thermistor decreases with increasing voltage levels above a predetermined threshold. As is understood by those skilled in the art, devices having negative resistance characteristics are capable of being connected in circuits for producing bistable switching. It should be understood that the curves of FIGS. 4 and 5 represent the behavior of the respective thermistor element when it has sufficient time to come to equilibrium under a given set of ambient conditions and that the shape and size of the curve may be altered by varying the ambient conditions as, for example, by applying heat to the thermistor element.

Figure 3:
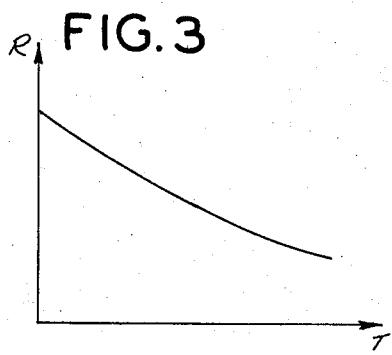
FIG. 3 is a graph similarly representing the changes in resistance with respect to changes in temperature of NTC thermistors employed in the apparatus of FIG. 1.

The resistance characteristics of the NTC thermistors N11–N14 are represented in the graph of FIG. 3. As may be seen, the resistance decreases with increasing temperature. The voltage-current characteristic of the NTC thermistors N11–N14 is represented in the graph of FIG. 5. As may be seen, the NTC thermistors N11–N14 also have a negative resistance region as indicated at NRN in which the voltage across the thermistors falls with increasing current above a predetermined threshold. This negative resistance region is, however, typically not as large nor as steep as that possessed by the PTC thermistors. It should be noted that the voltage and current scales have been reversed in FIG. 5 as compared with FIG. 4. It may thus be seen that the NTC thermistors, in certain respects, provide current analogs of the voltage characteristics of the PTC thermistors.

While NTC thermistors having gently sloped resistance characteristics and PTC thermistors having steeply sloped characteristics are illustrated herein by way of example, it should be understood that steep slope NTC and shallow slope PTC thermistors may also be employed under various conditions.

When thermistors having opposite temperature coefficients of resistivity are connected in series across a source of substantially constant voltage, electrical interaction between the two thermistors is obtained. Such series-connected thermistors are essentially voltage coupled in that, if the voltage across one of them changes, the voltage across the other must change in complementary fashion. In the apparatus illustrated in FIG. 1, the voltage applied to the leads L1, L2 is selected in relation to the characteristics of the particular thermistors to obtain a bistable or two-state switching mode of operation in which one and then the other of the thermistors in a pair pass through self-heating phases when that pair is triggered.

While a theory of operation for the thermistor pairs has not been completely developed, the following explanation has been found useful in understanding and working with these constructions. Thermistor pair 11 is taken as an example. Initially both the PTC thermistor P11 and the NTC thermistor N11 are relatively cool. The PTC thermistor P11 thus has a relatively low resistance while the NTC thermistor N11 has a relatively high resistance. Accordingly, only a relatively small portion of the supply voltage appears across the PTC thermistor P11. Although a relative large portion of the supply voltage thus appears across the NTC thermistor N11, only a relatively small current flows through the series-connected pair due to the relatively high resistance of the NTC thermistor. In this state both of the thermistors are outside of their negative resistance regions and the pair is stable in this initial equilibrium condition.

If, however, heat is applied from an outside source to the NTC thermistor N11, this heating has the effect of lowering the peak in the equilibrium NTC voltage/current characteristic and NTC thermistor N11 thus passes into its negative resistance region at the applied voltage. If NTC thermistor N11 is triggered in this way, it self-heats and tends to seek a new equilibrium at a higher temperature as determined by the electrical load in series with it. However, as NTC thermistor N11 self-heats toward the new equilibrium which it would acquire if its series load remained constant, the effect of this self-heating is to lower the resistance of the NTC thermistor N11 causing an increased portion of the source voltage to be applied to the series-connected PTC thermistor P11. The higher voltage applied to the PTC thermistor P11 causes it to pass into its negative resistance region and to begin a self-heating phase also. The load in series with the NTC thermistor N11 thus does not remain constant.

The heat generated by the self-heating of PTC thermistor P11 is coupled to the NTC thermistor N12 in the adjacent pair of thermistors 12 so that it also begins to self-heat and to thus initiate an electro-thermal cycle in the pair 12. In addition to starting a bistable switching cycle in the thermistor pair 12, the self-heat generated by NTC thermistor N12 is coupled back to PTC thermistor P11. The resultant total heat increases the resistance of PTC thermistor P11 to an extent which sharply reduces the current flowing through the series-connected pair 11.

This drop in current causes the NTC thermistor N11 to stop its self-heating action and to revert to its original, relatively cool equilibrium condition in which it exhibits a high resistance. The increased resistance of the NTC thermistor N11 further reduces the current through the series circuit 11 so that the PTC thermistor P11 also then passes out of its negative resistance region and reverts to its original, relatively cool equilibrium state. With both thermistors in their stable states, the circuit 11 is effectively reset and will remain quiescent until the NTC thermistor N11 is again triggered either by the application of external heat as described above or by some other method. In the meantime a cycle of bistable electro-thermal switching has been initiated in the thermistor pair 12. During the switching cycle of the thermistor pair 12, the self-heating phase of PTC thermistor P12 will initiate a bistable cycle of operation in the thermistor pair 13 which in turn initiates a similar cycle in pair 14, etc. Thus it can be seen that a string or sequence of bistable switching operations is propagated down the plurality of thermistor pairs or stages, each successive cycle being delayed in time with respect to the preceding cycle. The time required for completion of each bistable switching cycle is determined by the thermal inertia and dissipation characteristics of the thermistors which make up the pair. However, it may in general be noted that the periods required are typically much longer than those encountered or practically obtainable in wholly electronic components of similar size. Further, the time periods can vary over a wide range from stage to stage in the same apparatus.

Since the triggering of each successive pair or stage by the preceding stage is provided by thermal coupling between the stages, it can be seen that all of the stages can operate at essentially the same power level or that a low power stage may even trip a somewhat higher powered stage. Further, the stages which are thermally coupled may be electrically isolated from one another and powered from different sources.

Various ways of employing the sequential operation of the thermistor pairs 11–14 to control or energize other circuitry are disclosed in the aforesaid copending application, Ser. No. 608,230. For example, current or voltage sensing circuits may be used which respond to the electrical characteristics of the various thermistors. Alternatively, other thermistors may be used to sense the changes in temperature which occur upon self-heating of the various thermistors in the bistable pairs. By providing a chain or series of thermistor pairs of sufficient length, quite long and detailed timing and sequencing controls can be arranged for controlling sequential operations such as the washing, rinsing and drying cycles of an automatic dishwasher.

However, in various uses or applications such as a dishwasher, it may be necessary to interrupt the sequence of operations for various reasons. For example, in the case of a dishwasher it is typically necessary for safety sake that all operations cease if the door is opened. If the door is then closed it is desirable that the sequence of operations resume substantially at the point of interruption.

For this purpose the sequencer illustrated in FIG. 1 is provided with a memory circuit comprising a plurality of PTC thermistors MP11–MP14, there being one memory thermistor for each thermistor pair 11–14. Thermistors MP11–MP14 are of the type having a relatively sharply defined transition temperature as described with reference to FIGS. 2 and 4. These thermistors are connected in series between the junction between switches SW1 and SW2 and the common supply lead L2.

When the thermistors MP11–MP14 are relatively cool, i.e., at normal ambient temperatures, their resistances are all relatively low and a relatively high current will flow in the series circuit. This relatively high level of current is sufficient to produce self-heating of the thermistors. However, once any one of the thermistors reaches its transition temperature, its resistance increases sharply and a disproportionate share of the source voltage appears across this thermistor thereby increasing its power consumption. At the same time the current in the series circuit is appreciably reduced thereby preventing continued self-heating of any of the other thermistors in the series circuit. The one thermistor which reaches its high resistance state, however, will continue to be energized due to the increased voltage applied thereto. It can thus be seen that this configuration will provide stable, continuing self-heating energization of any one of the thermistors MP11–MP14 in which self-heating is initiated. It can further be seen that the initiation of self-heating in any one of the thermistors is operative to terminate continued self-heating energization of any other previously energized thermistor in the group since the increased resistance of the one reduces the series circuit current to a level insufficient to initiate self-heating in the others. If it is desired to initiate the sequencer with the first of the thermistor pairs (11) the memory thermistor MP11 which is associtaed therewith is constructed so as to have a slightly higher nominal resistance than the other thermistors which are in series with it. Accordingly, when the memory circuit is initially energized, the thermistor MP11 will heat somewhat faster than the other memory thermistors and will thus be the one to reach the transition temperature first thereby preventing continued self-heating of the other memory thermistors. If it is preferable rather than change the nominal resistance level of thermistor MP11 the same effect can be achieved by changing its dissipation characteristics, such as its physical configuration, or its thermal coupling with NTC thermistor N11. A similar or analogous type of exclusive operation may also be obtained by connecting switch type NTC thermistors in parallel across a source providing a substantially constant current.

Each of the PTC memory thermistors MP11–MP14 is thermally coupled to the NTC thermistor (N11–N14) in a respective one of the thermistor pairs 11–14. Means providing this thermal coupling is, as noted previously, indicated by the broken lines enclosing groups of thermistors which are thermally coupled to one another. Due to this thermal coupling, stable self-heating energization will be initiated in each of the thermistors MP11–MP14 when the respective thermistor pair 11–14 passes through an electro-thermal cycle. In other words, as each pair passes through its cycle, the respective memory thermistor (MP11–MP14) will be energized and any previously energized memory thermistor will be deenergized. Accordingly, if a sequence of electro-thermal cycles is interrupted, e.g., by opening the switch SW2 to cut off the flow of power to the thermistor pair 11–14, the memory thermistor MP11–MP14 corresponding to the electro-thermal cycle then in progress will be energized and will remain energized indefinitely so long as the switch SW1 remains closed. Accordingly, if electric power is thereafter reapplied to the pairs 11–14 by closing the switch SW2, the heat provided by the still energized memory thermistor will initiate an electro-thermal cycle in the respective thermistor pair. Thus the interrupted sequence will continue substantially from the point of interruption.

In summary, the operation of this apparatus is substantially as follows. When both switches SW1 and SW2 are closed, memory thermistor MP11 spontaneously self-heats for the reasons noted previously. Self-heating of thermistor MP11 initiates an electro-thermal cycle in the thermistor pair 11 which comprises thermistors N11 and P11. As the PTC thermistor P11 passes through its self-heating phase, the heat thereby applied to the NTC thermistor N12 in the next pair (12) initiates electro-thermal cycle in that pair. At that time, the heat generated jointly by thermistors P11 and N12 is coupled to the memory thermistor MP12 initiating self-heating therein. Due to the inherent exclusive operation of the memory thermistors MP11–MP14, energization of the thermistor MP11 is terminated. The electro-thermal cycle of pair 12 in turn initiates a similar cycle in the pair 13 and so on. If at any time the switch SW2 is opened, the thermistor pairs 11–14 will be deenergized. However, the memory thermistor (MP11–MP14) which was at that time energized by the last electro-thermal cycle will remain energized indefinitely. Thus, when the switch SW2 is again closed, heat from this memory thermistor will reinitiate an electro-thermal cycle in the respective thermistor pair thereby continuing the interrupted sequence substantially from the point of interruption. In the example mentioned previously in which this apparatus is employed to control the sequence of operations in a dishwasher, the switch SW2 may for example be constituted by the door switch which causes a cessation of operations when the door is open and the switch SW1 can be constituted by the start switch which is employed to initiate a cycle of operation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. Electro-thermal sequencing apparatus comprising:
 a first plurality of thermistors of the same temperature coefficient type;
 circuit means interconnecting said first plurality of thermistors with an electric power source for providing stable, continuing self-heating energization of any one of said plurality of thermistors in which self-heating is initiated, the initiation of self-heating in said one thermistor being operative to terminate continued self-heating energization of any other previously energized thermistor in said plurality;

a plurality of pairs of thermistors, there being one pair for each of the thermistors in said first plurality, one of the thermistors in each of said pairs being of a first temperature coefficient type and the other being of the opposite temperature coefficient type;

circuit means interconnecting the thermistors in each pair with each other to provide electrical coupling therebetween and for interconnecting each of said pairs of thermistors with an electric power source whereby heating of the thermistor of said first coefficient type in one of said pairs will initiate an electro-thermal cycle in which said one and then said other of the thermistors in said one pair pass through self-heating phases;

means for thermally coupling the thermistor of said opposite coefficient type in each of a group of said pairs to the thermistor of said first coefficient type in another of said thermistor pairs whereby the occurrence of an electro-thermal cycle in one of said group of pairs will initiate an electro-thermal cycle in another pair of thermistors thereby providing a sequence of electro-thermal cycles in successive pairs; and means for thermally coupling each of the thermistors in said first plurality to one of the thermistors in a respective one of said pairs thereby to initiate stable self-heating energization of each thermistor in said first plurality when the respective pair passes through an electro-thermal cycle whereby, if electric power is cut off from said pairs of thermistors during a sequence while energization of said first plurality of thermistors is maintained, the then energized thermistor in said first plurality will continue to be energized and will initiate an electro-thermal cycle in the respective pair of thermistors when electric power is reapplied to said pairs thereby continuing said sequence substantially from the point of interruption.

2. Apparatus as set forth in claim 1 wherein the thermistors in said first plurality have positive temperature coefficients of resistivity.

3. Apparatus as set forth in claim 2 wherein the thermistors in said first plurality are connected in series across a source providing a substantially constant voltage.

4. Apparatus as set forth in claim 3 wherein each of said positive temperature coefficient thermistors has a resistance characteristic having a transition temperature above when the resistance of said positive temperature coefficient thermistor rise relatively abruptly.

5. Electro-thermal sequencing apparatus comprising:
a first plurality of PTC thermistors;
circuit means connecting said PTC thermistors in series across a source providing a substantially constant voltage;

a plurality of pairs of thermistors, each pair including a PTC thermistor in series with an NTC thermistor;

circuit means connecting each of said pairs across said source whereby heating of the NTC thermistor in one of said pairs will initiate an electro-thermal cycle in which the NTC thermistor and then the PTC thermistor in that pair pass through self-heating phases in sequence;

means for thermally coupling the PTC thermistors in each of a group of said pairs to the NTC thermistor in another of said thermistor pairs whereby the initiation of an electro-thermal cycle in the first one of the pairs in said group will initiate a sequence of electro-thermal cycles in the other pairs in said series; and means for thermally coupling each of the first plurality of PTC thermistors to the NTC thermistor in a respective one of said thermistor pairs thereby to initiate stable self-heating energization of each thermistor in said first plurality when the respective pair passes through an electro-thermal cycle whereby, if electric power is cut off from said pairs of thermistors during a sequence of electro-thermal cycles thereby interrupting the sequence while energization of said first plurality of thermistors is maintained, the then enregized PTC thermistor in said first plurality will continue to be energized and will initiate an electro-thermal cycle in the respective pair of thermistors when electric power is reapplied to said pairs thereby continuing said sequence substantially from the point of interruption.

6. Apparatus as set forth in claim 5 wherein the PTC thermistors in said first plurality and the PTC thermistors in said pair each have a transition temperature above which the resistance of the thermistor rises relatively abruptly.

7. Apparatus as set forth in claim 5 wherein a predetermined one of the PTC thermistors in said first plurality has a higher nominal resistance than the others whereby when said apparatus is energized a sequence of electro-thermal cycles is initiated beginning with the pair of thermistors corresponding to said predetermined one of said PTC thermistors.

References Cited

UNITED STATES PATENTS

| | | | |
|---|---|---|---|
| 3,200,303 | 8/1965 | Maxwell | 317—139 X |
| 3,356,908 | 12/1967 | Mitchell et al. | 307—117 X |
| 3,417,259 | 12/1968 | Noawa et al. | 307—41 X |

ROBERT K. SCHAEFER, Primary Examiner

H. J. HOHAUSER, Assistant Examiner

U.S. Cl. X.R.

307—117; 338—22